US012689517B2

(12) United States Patent
Pol et al.

(10) Patent No.: US 12,689,517 B2
(45) Date of Patent: Jul. 21, 2026

(54) SYSTEM AND METHOD FOR IMPLEMENTING A VERIFIED DIGITAL ASSET PLATFORM

(71) Applicant: KPMG LLP, New York, NY (US)

(72) Inventors: Michal Pol, Mahwah, NJ (US); Sarah J. Bond, Chicago, IL (US); Jon Bradley, Webster, NY (US); Greg Genega, Copley, OH (US); Louis Goldberg, Bellmore, NY (US); Jiseon Stephanie Kim, Los Angeles, CA (US); Victor Charles Melilli, Fort Lauderdale, FL (US); Joshua Miller, Los Angeles, CA (US); Cory L. Myers, Ellicott City, MD (US); Nikola G. Ognjanovic, Medford, NY (US); Anu Desireddi Puvvada, Houston, TX (US); Edwige Sacco, Washington, DC (US); Bryan Samek, River Forest, IL (US); Andrew Urban, Seattle, WA (US)

(73) Assignee: KPMG LLP, New York, NY (US)

( * ) Notice: Subject to any disclaimer, the term of this patent is extended or adjusted under 35 U.S.C. 154(b) by 174 days.

(21) Appl. No.: 18/368,054

(22) Filed: Sep. 14, 2023

(65) Prior Publication Data

US 2024/0089112 A1      Mar. 14, 2024

Related U.S. Application Data

(60) Provisional application No. 63/406,523, filed on Sep. 14, 2022.

(51) Int. Cl.
| | | |
|---|---|---|
| H04L 9/32 | (2006.01) | |
| H04L 9/00 | (2022.01) | |

(52) U.S. Cl.
CPC .............. H04L 9/3234 (2013.01); H04L 9/50 (2022.05)

(58) Field of Classification Search
CPC ........ H04L 9/3234; H04L 9/50; H04L 9/3263
See application file for complete search history.

(56) References Cited

U.S. PATENT DOCUMENTS

| | | | | |
|---|---|---|---|---|
| 2021/0365544 | A1* | 11/2021 | Malin | .................... H04L 9/0819 |
| 2022/0058706 | A1* | 2/2022 | Gordon | .................... G06F 21/10 |
| 2022/0122062 | A1* | 4/2022 | Mayblum | ............ G06Q 20/381 |
| 2022/0138705 | A1* | 5/2022 | Wright | ................. G06Q 20/065 |
| | | | | 705/39 |
| 2022/0351195 | A1* | 11/2022 | Quigley | .................... H04L 9/50 |
| 2022/0383296 | A1* | 12/2022 | Gottschalk | ......... G06Q 20/3672 |
| 2023/0019045 | A1* | 1/2023 | Suwiryo | ............ G06Q 20/4014 |
| 2023/0029360 | A1* | 1/2023 | Castagna | .............. H04L 9/3263 |

(Continued)

*Primary Examiner* — Blake I Narramore
(74) *Attorney, Agent, or Firm* — HUNTON ANDREWS KURTH LLP

(57) ABSTRACT

The invention relates to computer-implemented systems and methods for implementing a verified digital asset platform. An embodiment of the present invention is directed to enabling companies to provide professional recognition awards to employees utilizing digital assets, such as NFT (Non-Fungible Tokens). With an embodiment of the present invention, a digital wallet may store public and private keys and allow the owner to perform various actions including access assets, manage assets and sign transactions.

20 Claims, 7 Drawing Sheets

(56) References Cited

U.S. PATENT DOCUMENTS

| | | | |
|---|---|---|---|
| 2023/0127651 A1* | 4/2023 | Cella ..................... | G06N 3/045 |
| | | | 705/7.11 |
| 2024/0022409 A1* | 1/2024 | Roper ...................... | H04L 9/50 |
| 2025/0131994 A1* | 4/2025 | Gross .................... | G16H 20/00 |

* cited by examiner

SYSTEM AND METHOD FOR IMPLEMENTING A VERIFIED DIGITAL ASSET PLATFORM

CROSS REFERENCE TO RELATED APPLICATIONS

The application claims priority to U.S. Provisional Application No. 63/406,523, filed Sep. 14, 2022, the contents of which are incorporated by reference herein in their entirety.

FIELD OF THE INVENTION

The present invention relates to systems and methods for implementing a digital asset platform, and more particularly to a verified digital asset platform.

BACKGROUND

During the hiring process, companies are left to rely on unverified information posted on sites such as business and employment-focused social media platforms or included in personal resumes written by applicants. This process is inefficient as it requires significant Human Resources (HR) involvement to sift through resumes and online personas of an individual applicant. Oftentimes, the information included in these resources are inaccurate, which may lead to ineffectual candidates being hired. Hiring managers have difficulty in accurately assessing a candidate's skills and their applicability to a particular role. In addition to the time and effort that an HR department has to put into assessing a candidate, a wrong hire could lead to having to repeat the process with urgency due to an immediate turnover.

Companies often recognize employee achievement via issuance of some sort of reward. These rewards can be provided in the form of monetary compensation or physical awards such as trophies or plaques. However, such rewards are not necessarily attached to a digital professional persona and are oftentimes not considered for a new position. In addition, awards lack context that would make them applicable and meaningful to other roles or companies. Further, awards or badges generally fail to capture soft skills or experiences of employees.

There are significant inefficiencies for multiple participants in the current hiring methodology. For one, HR departments conduct intensive time consuming and expensive searching to identify appropriate candidates for an open position. Applicants have to continuously update their online resume to keep their online professional presence up-to-date. While employers provide tangible awards to employees for professional recognition, those awards may not necessarily be reflected in the employee's digital professional presence. Issuers of educational/professional achievements are unaware of people inaccurately representing that they received an achievement from the institution, e.g., falsely claiming to have graduated from a school. For employers and other users, there is currently no clear mechanism to verify and share professional and other credentials.

Generally, employers want to know that someone has the skills they say they have without having to verify claims on a resume which can be time-consuming and challenging. Some employers are shifting to skills-based hiring. To do this, employers want to know that someone has the skills they say they have and that the candidate can apply those skills in different scenarios that are applicable to the role.

Additionally, credentials or badges that are issued today lack the context and details to improve hiring and career progression decisions.

It would be desirable, therefore, to have a system and method that could overcome the foregoing disadvantages of known systems.

SUMMARY

According to one embodiment, the invention relates to a computer-implemented system for implementing a verified digital asset platform. The system comprises: a microservices interface that communicates with a distributed ledger and further interfaces with an off-chain metadata data store; a user interface that communicates with one or more users; and a computer processor that is coupled to the microservices interface and user interface and further programmed to perform the steps of: enabling an issuer to confer one or more recognitions to a recipient wherein the one or more recognitions are verified; generating a digital token that uniquely identifies each recognition; storing the digital token on the distributed ledger; and providing access to the digital token via a digital wallet that is associated with the recipient wherein the digital wallet manages at least one private key to an account of the distributed ledger wherein the digital token represents at least one recognition conferred to the recipient.

According to another embodiment, the invention relates to a computer-implemented method for implementing a verified digital asset platform. The method comprises the steps of: enabling, via a user interface, an issuer to confer one or more recognitions to a recipient wherein the one or more recognitions are verified, wherein the user interface communicates with one or more users via a communication network; generating, via a computer processor, a digital token that uniquely identifies each recognition; storing the digital token on a distributed ledger that communicates with a microservices interface and an off-chain metadata data store; and providing access to the digital token via a digital wallet that is associated with the recipient wherein the digital wallet manages at least one private key to an account of the distributed ledger wherein the digital token represents at least one recognition conferred to the recipient.

The invention also relates to a computer-readable medium containing program instructions for executing a method for implementing a verified digital asset platform.

An embodiment of the present invention is directed to providing an end-to-end professional branding platform that allows employees to gather and manage their credentials. The digital assets platform may use Non-Fungible Token (NFT) technology to create a trusted blockchain based credential system. An embodiment of the present invention is directed to recognizing employees for various achievements, internal as well as external, through a digital asset, such as an NFT. Professional recognitions may include completing a class, receiving an award (e.g., pins, plaques, trophies, etc.), filing/receiving a patent, etc. Other achievements may include industry recognition, nominations, scholarships, etc. The digital assets platform may also consider subjective credentials. For example, a particular person may be considered a subject matter expert (SME) regarding crypto technology because they worked on five related engagements in a lead role, spoke at 10 conferences, etc. The digital asset platform gives companies access to verified credential data associated with candidates being considered for open positions. Accordingly, the digital assets platform provides empowerment to candidates by giving them control over what credentials and accomplishments are reflected to current and prospective employers.

Credentials captured as NFTs may reflect hard skills as well as soft skills, on-the-job learning and skill development, experiences, etc. For example, skill credentials may be combined into experiences (e.g., moments that matter, interactions, etc.) to show how they have been applied in different settings. An embodiment of the present invention is not limited to open positions. Other scenarios may include internal transfers, new opportunities (e.g., stretch assignments, projects, etc.). With an embodiment of the present invention, these credentials provide context and value to current and prospective employers to improve hiring and career progression decisions.

Other benefits may include efficient hiring through streamlined talent acquisition by verifying skills and credentials, thereby reducing time-to-hire. An embodiment of the present invention may realize skills alignment where the right candidate is matched to the right role, resulting in optimization of team compositions. Talent Management may involve gaining a holistic view of an employee's skills, experiences, and potential thereby enabling an improved workforce development. Data-Driven Insights provide access to analytics on skill trends, popular credentials, and employee engagement for informed decision-making. An embodiment of the present invention provides an ability to anticipate future skill needs with AI-driven forecasting and prediction tools. For example, an embodiment of the present invention may provide a replaceable skills identification feature that determines which skills within an organization may be susceptible to automation and AI replacement. Another example may include a role impact assessment feature that analyses which roles in an organization may be at a greater risk due to AI advancements. This may include understanding the depth of impact down to the specific skills within those roles. Efficiencies may be achieved through reduced costs associated with bad hires, prolonged vacancies, and redundant training by ensuring the right fit from the start.

Digital assets exist on an actual blockchain and may be supplemented by off-chain metadata. Each digital asset on the blockchain is owned by a blockchain account (0x 1234 . . . ). An account is owned by a user and the user's way of using their account (e.g., submit transactions, sell NFTs, make transfers, etc.) is by signing each transaction with their unique and secret private key. A wallet may represent a tool that allows a user to manage the private keys to their blockchain accounts and make the process of signing transactions easier and more secure. Generally, a user may login by entering an email and password. A user may login by using a wallet to sign a transaction with a private key that proves the user is the owner of a particular blockchain account (0x1234 . . . ). By doing so, the application knows which NFTs to show as being properly owned, which may be further confirmed by data from the blockchain. According to an embodiment of the present invention, the application enables the user to use their wallet to connect to their blockchain account, retrieve the appropriate credentials/ digital assets from the blockchain, the associated off-chain metadata, and further allow the user to apply to jobs, update their resume, etc.

According to an embodiment of the present invention, a user may own a blockchain account where a digital wallet may serve as a tool that the user may use to manage their own accounts/private keys. With an embodiment of the present invention, digital assets may exist on a public blockchain that the user may access and use.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
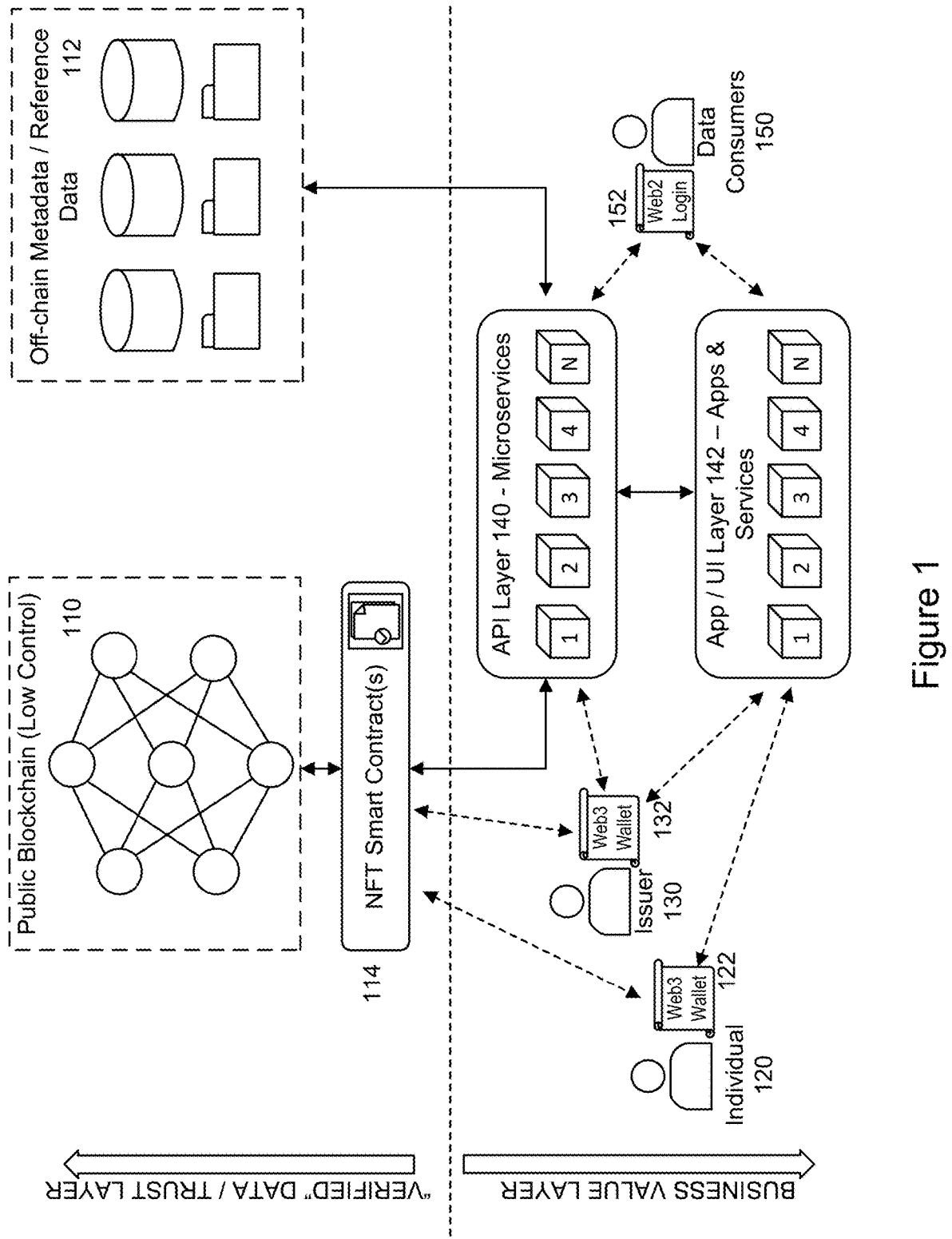
FIG. 1 is an exemplary system platform architecture, according to an embodiment of the present invention.

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to enabling companies to provide professional recognition awards to employees utilizing digital assets, such as NFTs (Non-Fungible Tokens). For example, as patent applications filed by employees are issued, an NFT may be conferred to the employee as an achievement award. NFTs may represent digital data stored on a blockchain or other distributed ledger. More specifically, the ownership of the NFT may be recorded in the blockchain. NFTs may include a reference or address that uniquely identifies a particular digital asset which in this case may refer to skills, recognitions, certificates, degrees, experiences, professional and/or other achievements.

With an embodiment of the present invention, a user, such as an employee, may use a digital wallet to store private and public keys that allow the user to access assets stored on a blockchain and may then be used to sign/execute transactions. Digital assets may be stored in the blockchain and certain attributes in off-chain systems. The digital wallet may be accessible through a computer, mobile device, and/or other processing device. The employee may provide access to a selected number of NFTs associated with the employee's profile/account. For example, the owner may provide limited access to a prospective employer. After contact has been made and an interview has been scheduled, the employee may provide full access to an entire portfolio of digital data stored in the digital wallet. Other variations of access levels may be granted and applied. In addition, the digital wallet may get updated as the owner receives recognitions, awards, completes classes, courses, projects and/or performs other actions. The updates may occur automatically as they are acknowledged in a conferring system or through the employee's or a human resources representative's input. A digital wallet may be used by an owner to manage their accounts and/or private keys. Existing systems lack portability because assets exist in closed/private data systems owned by organizations. After an employee departs an organization, they no longer have access. According to an embodiment of the present invention, digital assets may exist on a public blockchain that may be accessed and used regardless of employer/employment.

An embodiment of the present invention has internal uses as well as external uses. For example, a company may internally recognize employee achievements through the assignment of professional merit awards. An embodiment of the present invention may use skills and experience matching for roles and internal transfers. External to the company, an embodiment of the present invention may leverage NFTs and blockchain technologies to provide a platform of applicants with verified data related to their professional background and achievements. This may include a digital identity so employers may trust that the owners of these digital assets are real people and further verify the authenticity of the NFTs and identity of the holder.

According to an exemplary illustration, the digital asset platform may be created and managed by a third party provider. The digital asset platform enables users (such as employees, candidates, students, etc.) to safely and confidently manage their professional digital assets. In addition, employers and other verified data consumers may access the trusted platform to reach prospective employees that have been verified.

The digital asset platform may support various participants, including Issuers, Employers, Employees and/or other individuals/users. Issuers may represent institutions, universities, employers, professional certifications and other distributors of recognition which may relate to local, national and global levels. In addition to recognition, an issuer may certify that someone has the skill (e.g., hard or soft), demonstrated the skill in a moment that matters or other situation, and/or certify they completed or have a degree, professional credential, etc. Issuers may distribute and/or confer various types of recognition, e.g., certification, training, accreditation, membership, etc. This may relate to hard and soft skills, proficiencies, experiences, etc. An embodiment of the present invention provides a mechanism for institutions (e.g., universities, trade schools, employers, etc.) to manage their credentials and further protect their brand and reputation. In addition, a feature may include inserting a timestamp or expiration date for some certifications, e.g., if someone was certified for a license in 2001 with an expiration of 2011, this certification should not show up as being "active" in 2022.

According to an exemplary scenario, an employer may confer digital assets, such as NFTs, to deserving or qualified employees. This may be part of a human resources function or a digital asset managers/groups (professional development group).

Digital assets may refer to various recognitions, awards including skillsets, education, courses, accomplishments, experiences, etc. An embodiment of the present invention may support various industries with different preferences or standards for recognition. For coders, employers may be more impressed with experience level (e.g., projects, builds, implementation, etc.) as opposed to education or degree. In this particular industry, the digital assets platform may focus on specific skills, projects, experiences, etc.

Other applications may relate to investors and/or startup entity review. An embodiment of the present invention provides an ability to access assigned skills/experiences in the digital wallets associated with an entity. An embodiment of the present invention may also be used in due diligence activities performed by potential investors when evaluating potential startup investment opportunities.

An embodiment of the present invention may be applied to an individual, team, division/unit as well as an entire company, conglomerate, or entity having various organizational structures. For example, a venture capital (VC) firm may use the digital asset platform to assess a start-up company. The VC firm may assess various individuals, CEO, CTO as well as examine units or teams, e.g., technical team, finance team, etc. The platform may provide details regarding skills, experience and/or credentials at the individual, team and/or company level. The platform may also provide a Skill Gap Analysis feature that identifies organizational skill gaps compared to industry benchmarks and competitors. For example, employers may be provided with a visual representation of a skill distribution within an organization, highlighting areas of strength and gaps. The platform may also provide Team Skill Overlays that allow managers to overlay the skills of their team members to identify synergies and gaps for planning. Other graphics, tools and analysis may be supported.

The digital assets platform may support various implementations. According to an embodiment of the present invention, a platform may be designed such that employers may access a pool of verified candidates with verified credentials. In addition, issuing institutions may have access to the platform to issue NFTs to the digital wallets of associated users.

According to another embodiment of the present invention, employers may use the platform to issue NFTs to employees receiving professional recognition awards. Back-end systems may include blockchain technology where digital assets such as NFTs may be stored. A digital wallet including digital assets owned/acquired by individual users on the platform may be accessed by employers, issuing institutions as well as other permitted users/entities.

According to yet another embodiment of the present invention, investors and/or researchers may review various digital assets associated with a single institution when understanding the scope of skills or achievements of the entire entity. This may be performed during investor due diligence, with the peace of mind of accessing data from a verified database and platform, as opposed to user curated information from a third party or unknown source.

The various embodiments of the present invention may provide advantages and benefits unavailable through current technology. With the digital asset platform, employers may confidently access a curated pool of potential applicants with verified credentials. This creates a more efficient HR process and reduces onboarding time of employers. In addition, employees and prospective employees may expand their professional brand and resume. An embodiment of the present invention may be directed to integrating an evolving skills ontology using artificial intelligence ("AI") with a curated pool of potential applicants and/or employees across platform(s). This enables skills forecasting where AI may be applied to analyze current job market trends, identify in-demand skills for a near future, etc. In addition, this enables future skills predictions and further anticipates an evolution of skills as well as an emergence of new competencies for long-term planning.

Institutions may control who is affiliated with their programs and ensure that their name and reputation are not being fraudulently or improperly used by non-affiliated persons.

Employees/users on the platform have the advantage of ensuring that their credentials are "portable" and available to prospective employers.

With an embodiment of the present invention, employers may modernize their employee recognition system by issuing digital assets instead of tangible awards which may not be incorporated in the portfolio of a user. For example, employers may modernize their employee recognition systems, employee engagement, employee experience, talent recruiting and management.

The digital asset platform may support various commercialization options. For example, the digital asset platform may be monetized by charging employers for access to a user interface where searches from the verified employee pool may be accessed. Credential Issuing Institutions may be charged to access the platform and issue credentials to the user pool. The digital asset platform may support various payment options, including a Subscription Model (e.g., Monthly/Annual charge for unlimited access to the platform) as well as a la carte Payment Model (e.g., charge for each individual search or issuance of digital asset). Various pricing models may be supported including, but not limited to, models that allow employees and candidates to monetize access to their data or monetization of their data.

The digital asset platform may be applied across multiple businesses, sectors, industries, etc. Different businesses may have different types of recognitions, awards, certificates, etc. An embodiment of the present invention may normalize such recognitions across companies, sectors, industries, etc. The comparisons may be as broad or detailed/granular as desired or needed.

In addition, each company may have its own way of conferring certificates, awards and/or other recognitions. An embodiment of the present invention enables companies to better understand and appreciate their employees and abilities. An entity, such as a company or institution, may apply their own taxonomy for skills and competencies for roles or when it comes to conferring awards and recognitions. The digital asset platform may normalize multiple taxonomies to provide a way to equally compare candidates. For example, taxonomies may be incorporated into a skills ontology with dynamic skills database that adapts to industry trends and job market shifts.

As the platform provides a wealth of verified information, an employer may perform various functions including searches. For example, an employer may define a specific skill set through a keyword search, categories and/or text description. The platform may then provide a list of credentials (e.g., education, projects, classes, recognitions, etc.) that would best fit the specific skill set. The digital asset platform may then execute a search for verified potential candidates. A list of potential candidates may be provided with emphasis on relevant experience, credentials, recognitions, etc. In addition, the digital asset platform may facilitate communication and outreach to the potential candidates and expedite the interview process. In addition to searching, an employer may use a matching engine based on skills, credentials, employer needs and/or other considerations to align with a particular role, job, opportunity, project, position, etc. For example, matching may take into account a candidate's or employee's career aspirations so the user may see how well this opportunity aligns to the candidate's aspirations and/or goals. The platform may enable the matching engine to ingest a job description and then extract the skills, experiences and/or other qualifications/factors to identify viable candidates and/or leads.

In a similar manner, prospective employees may identify positions they are interested in as well as employment specifics, such as work from home, partial remote work, travel opportunities, preferred geographic location, etc. For example, prospective and existing employees may identify positions, opportunities, and/or experiences that align to their career aspirations, goals, etc.

For each digital asset, the platform may identify a verification status. This may include various stages of verification such as verified status, unverified status, pending verification, pre-verification, etc. For example, when a recognition is initially conferred, the platform may post as unverified, pre-verification or pending verification. When the digital asset is posted to the blockchain, the status may be updated to a verified status. Other variations on status may be applied. Prior to posting on the blockchain, the platform may perform an initial pre-verification that may involve checking the issuer's history and/or other activity. Periodic verifications and audits may be performed to confirm validation.

An embodiment of the present invention may apply artificial intelligence (AI), generative AI, and/or machine learning (ML) at various stages of the workflow. For example, the platform may apply characteristics of a successful hire in the employee search process for similar companies with common hiring needs. In addition, an embodiment of the present invention may support a Credential Combinations feature that stacks skills and experiences to create moments that matter using generative AI to identify new combinations. An embodiment of the present invention may support Credential Visuals that may use generative AI to create a visual identity of moments that matter. Moments that Matter may refer to a significant event, experience, and/or milestone in an employee's professional journey that has a profound impact on their career development, personal growth, as well as overall well-being. These moments may be considered pivotal in shaping an employee's motivations and/or decisions related to their work and may further influence performance, engagement, and/or loyalty to their employer. For example, skill gaps may be identified with additional insights on target skills to develop based on industry trends, employer needs, etc. Here, the platform may recommend new experiences and/or opportunities to the user so they can acquire those skills. Other features may include identifying potential coaches, mentors and/or other contacts or connections based on skill needs and career aspirations.

An embodiment of the present invention may incorporate AI/ML to proactively increase skills within an applicant base. This may involve dynamically identifying or matching skills and/or learning opportunities for relevant applicants. For example, an embodiment of the present invention may apply AI/ML to match learning and skills opportunities with eligible candidates in a verified employee pool. An embodiment of the present invention may seek to monitor the verified employee pool for relevant candidates. Inputs may be received from employer, prospective employees, institutions and/or other service providers. For example, an employer may provide inputs relating to a specific skill/experience. In response, an institution may provide opportunities relating to classes, lectures, internships, etc. The AI/ML component is dynamic and expands with the verified pool of applicants and may also consider requests from employers and available learning and skills opportunities from institutions. Inputs from employees seeking to expand their skills may also be considered.

The platform may monetize this feature by upselling to or collaborating with institutions that provide the learning opportunities. Additionally, an embodiment of the present invention may provide statistics and growth rates based on matches, etc. For example, the platform may maintain statistics to prove up the value proposition to employer partners by demonstrating the platform's ability to take an active approach in providing skill sets that employers are seeking.

The digital asset platform may be applied to other applications, scenarios, industries including financial services, banking (e.g., loan applications), professional services, government contracting, manufacturing, legal, healthcare, dating platform, etc.

FIG. 1 is an exemplary system platform architecture, according to an embodiment of the present invention. FIG. 1 illustrates a public permissionless blockchain model.

As shown in FIG. 1, the "Verified" Data/Trust Layer provides a decentralized way to issue, own, and verify credentials, certificates, experiences, work history, etc. that may be defined, tracked and associated with individuals and organizations.

The "Business Value Layer" represents a fully customizable layer that defines various API services and applications/user interfaces to create real value for employers, HR teams, universities, individuals, employees, freelancers, contractors, students, smaller organizations, professional institutions, industry associations, technology certification providers, sector specific skill certifiers, etc. It may be as simple as providing access to the verified data through APIs to building complex products or customized platforms for organizations. Because value at this layer may be created in many different ways for different stakeholders (e.g., each one would have custom UI), various interfaces and experiences may be supported. An embodiment of the present invention may support a mechanism to share credentials as a dedicated API service.

Various applications and services may include: issuer onboarding and lookup; individual/employee onboarding and lookup; internal staffing applications (e.g., issue credentials and also consumer data to staff engagements, rotations, etc.); HR/recruiting application (e.g., source verified credentials and experience data to hire and find candidates, with advanced search and filtering capabilities); company analysis (e.g., roll up employee credentials to company or department level for analysis, analytics on skill trends, popular credentials, employee engagement, diversity metrics, and generational insights); job board (e.g., job postings with minimum requirements to filter out unqualified candidates automatically based on verified badges/credentials); digital resume editor (e.g., allow individual/employee to customize their own career preferences using verified credentials); mechanism/service with different options (e.g., UI, APIs, smart contracts) to issue new credentials; governance application (e.g., companies at industry level can define standards for subjective credentials and experience); wallet custody, etc.

Individual 120 may have an associated wallet (e.g., web3 wallet 122) that communicates with NFT Smart Contract(s) 114 supported by Public Blockchain 110. Public Blockchains may represent permissionless blockchains that are open and decentralized so that anyone in the network may access. Issuer 130 may have an associated wallet (e.g., web3 wallet 132) that also communicates with NFT Smart Contract(s) 114. Individual 120 and Issuer 130 may have a web2 login associated with a wallet represented by 122 and 132, respectively. NFT Smart Contracts represent programming that enables storage of digital assets on the blockchain and provides access to the digital assets. NFT Smart Contracts may also define rules such as whether transfers of a digital asset to another account are allowed. For example, a user may lose access to an account's private key. Upon verification or proof, the user may transfer or the system may re-issue the user's existing credentials to a new account. In addition, transfers of certain assets, such as diplomas, badges, etc. may be prohibited.

Further, smart contracts ensure that the information stored is transparent and uniquely identified. Issuer wallet, shown by 132, may further communicate with API Layer 140 and App/UI Layer 142. API Layer 140 supports microservices. App/UI Layer 142 supports Applications and Services.

APIs facilitate communication between the smart contracts and Apps/UIs. Additionally, dedicated APIs may be created for specific purposes, such as 1) provide query capabilities for digital assets so that customers may build their own custom apps that use the APIs to get data or issue credentials, 2) notification services that monitor different events, 3) automated way to know your customer (KYC) if the right data is submitted, etc. Apps/UI layer may include an application for searching a pool of candidates for hiring with advanced analytics and filter capabilities, an online resume editor for individuals allowing them to customize their preferences with verified credentials, etc.

Data Consumers 150 may have an associated interface, shown as Web2 Login 152, that communicates with API Layer 140 and App/UI Layer 142.

API Layer 140 may communicate with Off-Chain Metadata/Reference Data 112. Off-Chain Metadata and Reference Data may include data external to a blockchain. With blockchains, especially big public blockchains like Ethereum, it is typically expensive to store data beyond the bare minimum required to prove ownership of a digital assets. This is why the digital asset on the blockchain typically has a pointer to off-chain metadata that supplements the digital assets and provides additional information and/or files. Properties may be used to determine the value and filter/sort. For example, the off-chain metadata may include date earned, expiration date, description, issuer name, an image/GIF/animation/file like a trophy, badge, etc. Other metadata may include skills, skills hierarchy, peer validators, etc.

This provides a mix of public decentralized (IPFS) and private centralized (controlled by one or more organization) infrastructure. IPFS represents InterPlanetary File System which is a protocol and peer-to-peer network for storing and sharing data in a distributed system. IPFS uses content-addressing to uniquely identify data in a global namespace. Other protocols may be implemented. In addition, the system may support know your user (KYU), user onboarding and wallet custody features. An embodiment of the present invention may set-up and maintain NFT Smart Contract(s) 114, API Layer 140 and App/UI Layer 142.

An embodiment of the present invention may leverage distributed ledger technology, such as blockchain, to store and manage digital assets. The distributed ledger technology provides a secure platform through public, private, semi-private blockchain. Other distributed ledger technology and networks may be supported.

An employer may submit a set of certificates to confer to individuals through the digital asset platform of an embodiment of the present invention. The platform may then verify the certificates and place a corresponding digital asset on a distributed ledger, such as blockchain. Each user may have an associated wallet that receives and manages the user's digital assets. The distributed ledger provides security, authentication and access control. For example, an individual may grant access to an issuer of awards. The institution may sponsor the individual's digital wallet. The digital wallet may be personal to the individual and transition with the individual. The digital wallet may serve as a portfolio, resume and/or other collection of achievements and skills that may be accessed by authorized entities.

As each blockchain transaction has an associated cost, the platform may batch transactions at off-peak hours (e.g., late night hours) for cost efficiencies. Machine learning and/or artificial intelligence may be applied to determine an optimal time and methodology to place digital assets on a distributed ledger or blockchain to realize cost and other efficiencies.

Figure 2:
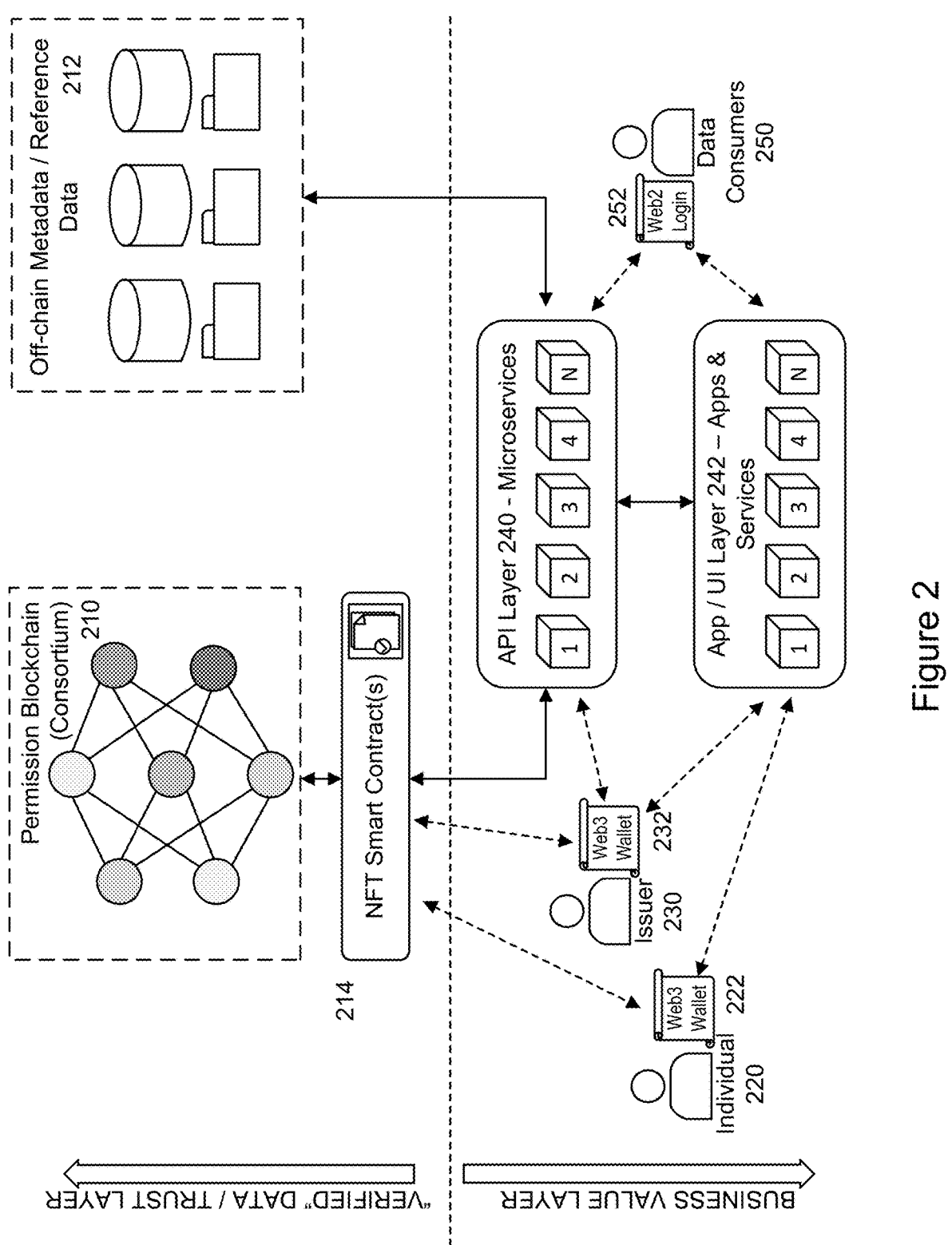
FIG. 2 is an exemplary system platform architecture, according to an embodiment of the present invention.

FIG. 2 is an exemplary system platform architecture, according to an embodiment of the present invention. FIG. 2 illustrates a hybrid/public permissioned blockchain model.

Individual users 220 may have an associated wallet, shown by 222, that communicates with NFT Smart Contract(s) 214 supported by Permissioned Blockchain 210 (consortium). Permissioned Blockchains represent a distributed ledger that is not publicly accessible and may only be accessed by users with permissions. Public permissioned blockchain may run and be governed by a consortium of organizations. Consortium blockchain represents a type of semi-decentralized network in which members are granted to a group of individuals or nodes, rather than a single entity.

Issuer 230 may have an associated wallet, shown by 232, that also communicates with NFT Smart Contract(s) 214. Issuer wallet, shown by 232, may further communicate with API Layer 240 and App/UI Layer 242. API Layer 240 supports microservices. App/UI Layer 242 supports Applications and Services.

Data Consumers 250 may have an associated interface, shown as Web2 Login 252, that communicates with API Layer 240 and App/UI Layer 242.

API Layer 240 may communicate with Off-Chain Metadata/Reference Data 212. This provides a mix of public decentralized (IPFS) and private centralized (controlled by a consortium of organizations) infrastructure. The system focuses on KYU and user onboarding and wallet custody. An embodiment of the present invention may set-up and maintain NFT Smart Contract(s) 214, API Layer 240 and App/UI Layer 242.

Figure 3:
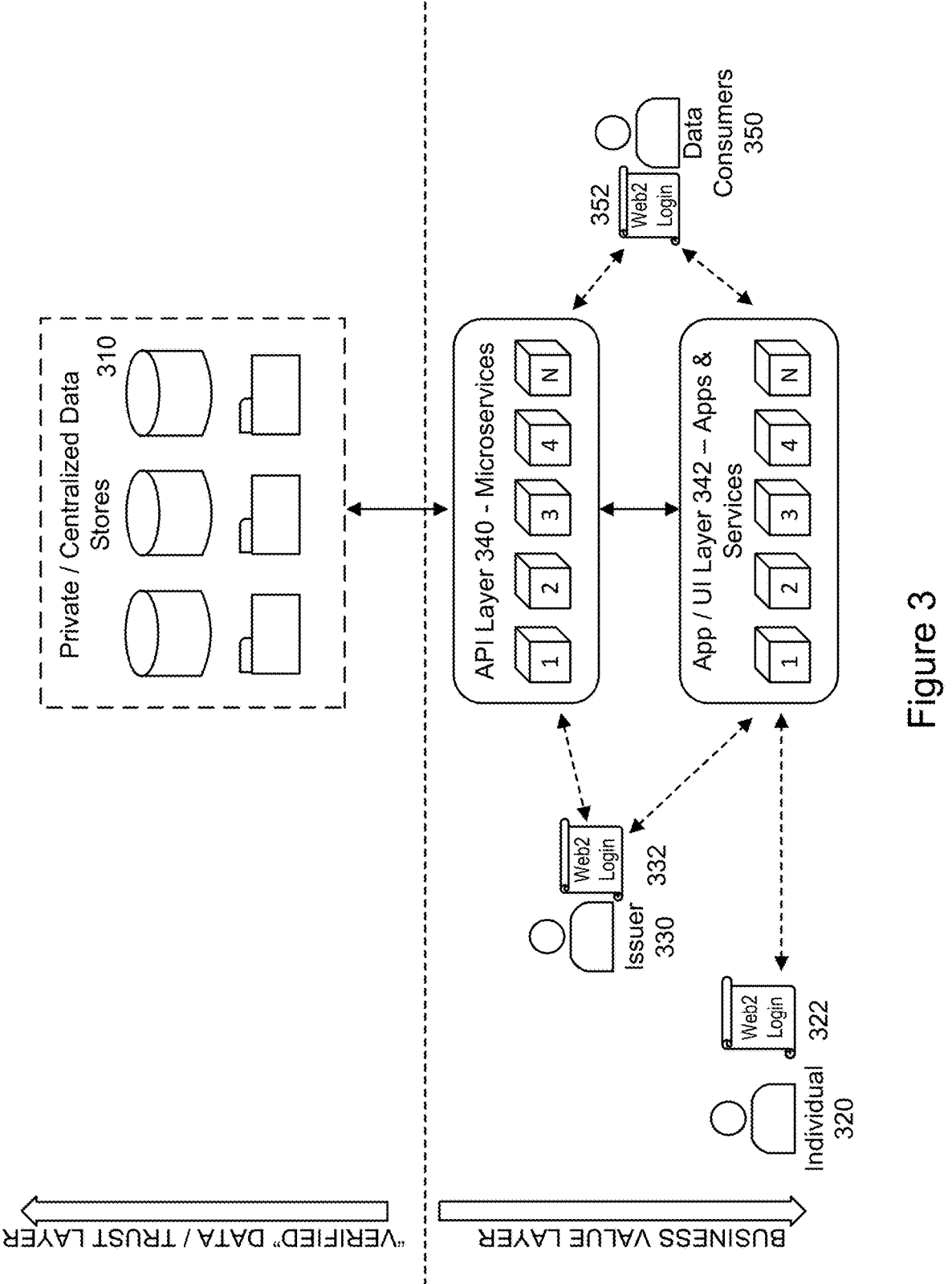
FIG. 3 is an exemplary system platform architecture, according to an embodiment of the present invention.

FIG. 3 is an exemplary system platform architecture, according to an embodiment of the present invention. FIG. 3 illustrates a centralized model.

Individual 320 may interact with a web login, shown by 322, that communicates with API/UI Layer 342. Issuer 330 may interact with a web login, shown by 332, to communicate with API Layer 340 and App/UI Layer 342. API Layer 340 supports microservices. App/UI Layer 342 supports Applications and Services.

Data Consumers 350 may interact with an interface, shown as Web2 Login 352, that communicates with API Layer 340 and App/UI Layer 342.

API Layer 340 may communicate with Private/Centralized Data Stores 310. This infrastructure may be owned and hosted by one or more organizations that govern the platform. An embodiment of the present invention may set-up and maintain API Layer 340 and App/UI Layer 342.

Figure 4:
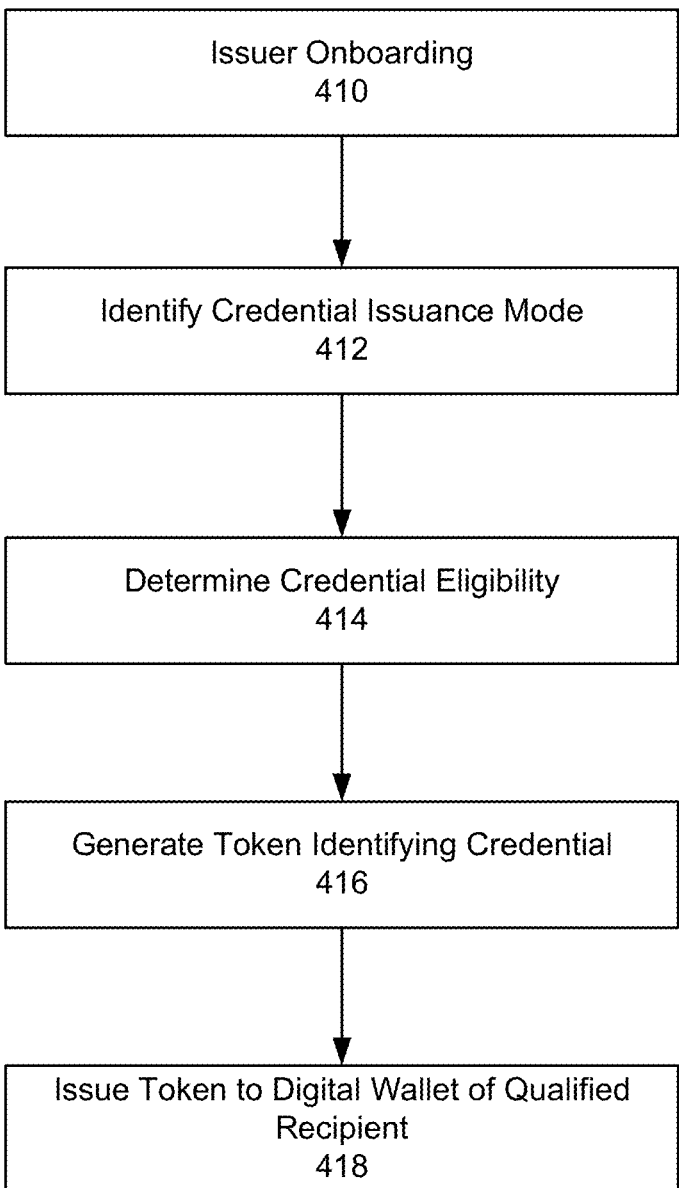
FIG. 4 is an exemplary flow diagram, according to an embodiment of the present invention.

FIG. 4 is an exemplary flow diagram, according to an embodiment of the present invention. FIG. 4 illustrates an issuer flow diagram. At step 410, an issuer may go through an onboarding process. This may include verification, background check, etc. At step 412, the issuer may identify a preferred mode of credential issuance. This may include App/UI, integration with APIs, direct issuance through NFT smart contracts (e.g., using web3 wallet). At step 414, the issuer may determine credential eligibility. This may reflect a recognition, completion of a class, on-the-job experience/training, and/or other information that may be identified through the use of artificial intelligence. At step 416, a token identifying the credential may be generated. At step, 418, tokens may be issued to an individual's address. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

Optional steps may include: peer validation, credential enrichment, etc. This may provide additional data for improved relevancy to employers including verification (or proof) of the claimed skill or achievement.

Figure 5:
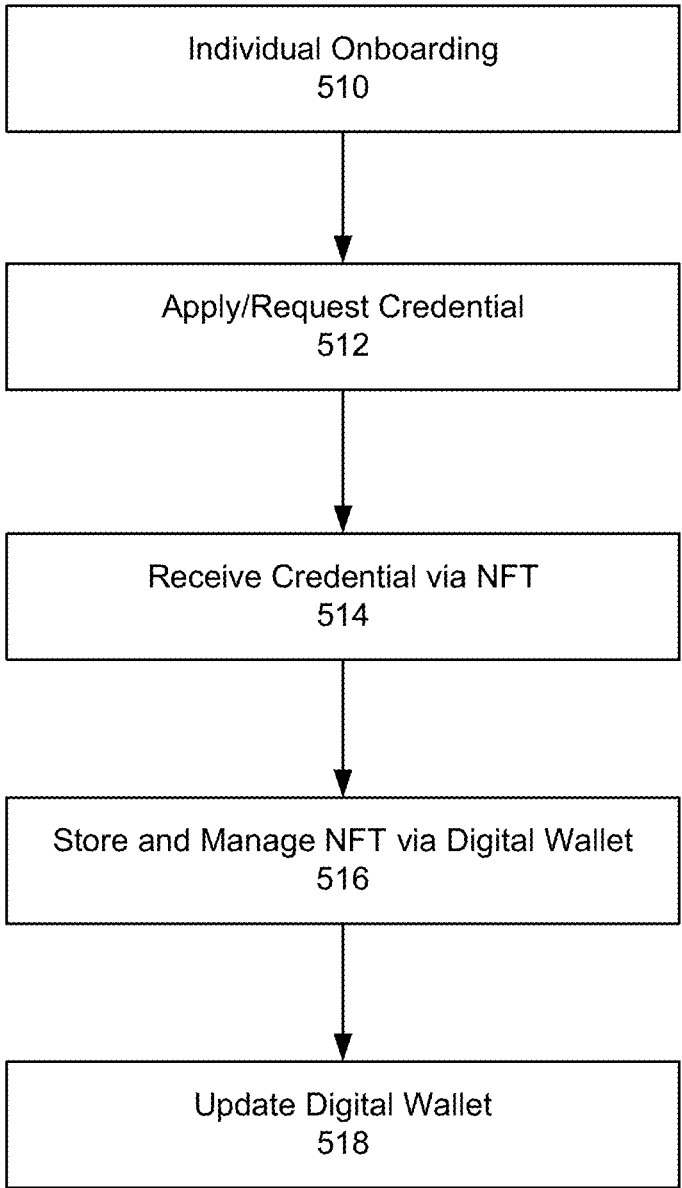
FIG. 5 is an exemplary flow diagram, according to an embodiment of the present invention.

FIG. 5 is an exemplary flow diagram, according to an embodiment of the present invention. FIG. 5 illustrates an individual user flow diagram. At step 510, an individual may go through an onboarding process. This may include profile setup, verification, background check, etc. At step 512, the individual may apply for or request credentials. The individual may also wait for the issuer to issue credentials directly to the individual. At step 514, the individual may receive NFTs for each credential. At step 516, the individual may store and manage NFTs via a digital wallet. For example, the individual may use the NFTs in various applications and communications. At step 518, the digital wallet may be updated. The digital wallet may accurately reflect the individual's portfolio in real-time and may further transition with the individual. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

Figure 6:
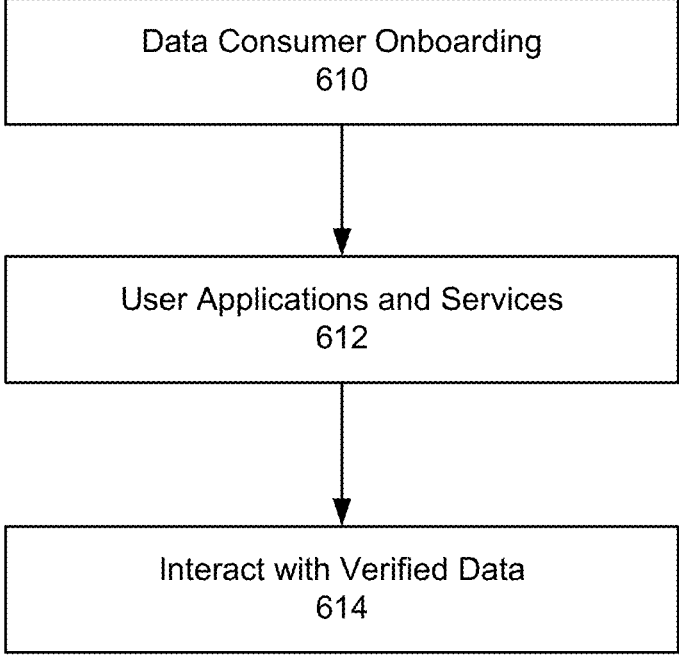
FIG. 6 is an exemplary flow diagram, according to an embodiment of the present invention.

FIG. 6 is an exemplary flow diagram, according to an embodiment of the present invention. FIG. 6 illustrates a data consumer or issuer flow diagram. At step 610, a data consumer may go through an onboarding process. This may include profile setup, verification, etc. At step 612, the data consumer may use applications and services. This may include identifying a pool or list of candidates with verified credentials and qualifications. This may relate to an employer search. Other applications and services may be supported across industries. At step 614, the user may interact with verified data, such as using web2 credentials, email/username and password combination. While the process of FIG. 6 illustrates certain steps performed in a particular order, it should be understood that the embodiments of the present invention may be practiced by adding one or more steps to the processes, omitting steps within the processes and/or altering the order in which one or more steps are performed.

With an embodiment of the present invention, users may create and manage their own digital identity within the platform. An embodiment of the present invention may incorporate various types of tokens, such as soul-bound tokens (SBTs) which represent a non-transferrable token. SBT may include digital identity tokens representing a person or entity's characteristics, features, traits, achievements, etc. An embodiment of the present invention may support the use of self-sovereign identity technology and other services to verify a user. Once the token is created and assigned to a blockchain account, it cannot be moved out of that account. For reference, a blockchain account (may look like 0x12345678 . . . ) is used on the blockchain ledger to track ownership of assets. Accounts are accessible through private keys and wallets that allow users to manage and use their blockchain accounts and private keys.

An exemplary process may involve the following: (1) user completes KYC process; (2) user connects a single blockchain account they own and signs a transaction with their private key (through wallet) proving that they own that specific account; (3) an SBT gets created and sent to the user's account (e.g., user cannot delete or transfer the SBT out of that account; SBT contains metadata that can be used to prove the identity of the user without revealing their private info used for KYC process); (4) credentials/experiences issued as NFTs are issued for that specific SBT and sent to the same account; and (5) credentials/experiences are only valid if they are in the same account as the SBT.

An embodiment of the present invention may be directed to providing an ability to enrich existing credentials with additional data. An embodiment of the present invention may capture credentials already issued and integrate them into the employee's profile or resume. Credential hierarchy may include stacking and combining where multiple credentials may be combined that are related to one another or to create moments that matter (which may include multiple credentials, credential group, etc.), a story (which may include multiple moments that matter) as well as other combinations.

An embodiment of the present invention is directed to token gating to provide access to specific content, features, and/or services. Token gating may provide exclusive community access that may be used to provide personalized experiences, build community and support.

An embodiment of the present invention is directed to supporting endorsements which allows employees to endorse each other's skills and credentials thereby adding a layer of peer validation.

Figure 7:
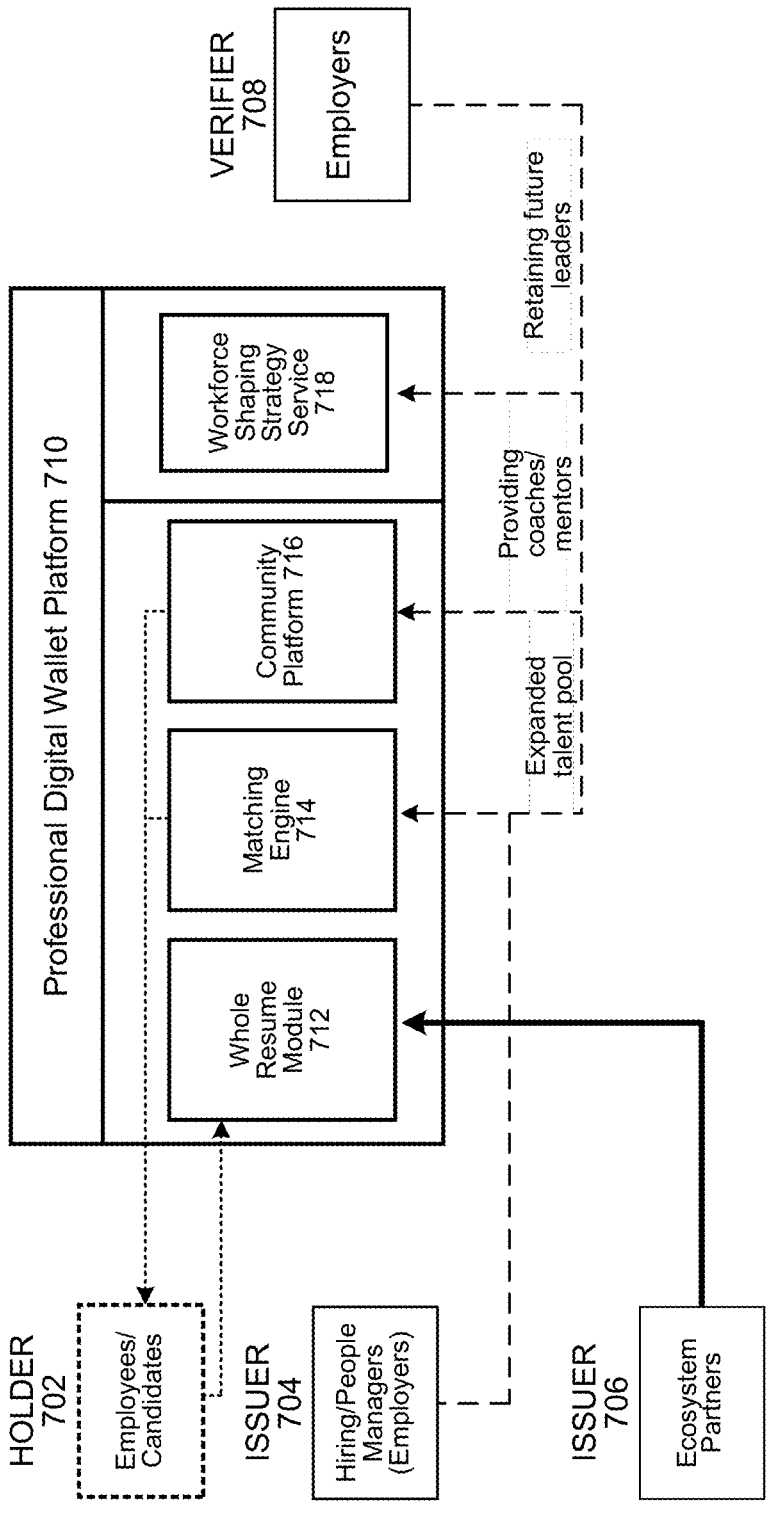
FIG. 7 is an exemplary system diagram, according to an embodiment of the present invention.

FIG. 7 is an exemplary system diagram, according to an embodiment of the present invention. Professional Digital Wallet Platform 710 may include various modules and services including Whole Resume Module 712, Matching Engine 714, Community Platform 716 and Workforce Shaping Strategy Service 718. Other modules, services, features and/or components may be integrated.

Whole Resume Module 712 enables users to showcase their story, highlight experiences/moments that matter; present verifiable credentials and develop a career goal roadmap.

Matching Engine 714 matches an employee's success markers to the right role. Matching Engine 714 may consider hidden skillsets. Hidden skillsets may represent skills, talents, and/or competencies that an employee possesses but may not be immediately evident and/or directly related to their current role. These skillsets may be acquired through various methods including, but not limited to, non-professional experiences, hobbies, volunteer work, etc. These skills may be considered "hidden" because they have not been showcased or explicitly used for their current role. For example, an employee who volunteers at a non-profit and provides mentorship to youths may have skills related to coaching, mentoring, empathy, building relationships. This may be considered hidden skills or skillset if their job is in accounting, and they do no use these skills for their current role.

Community Platform 716 provides a platform to enable users to find coaches, mentors and/or other connections. The platform may provide access to tools, materials, courses, programs, and/or other information to facilitate continuous learning and development. These resources aim to advance the knowledge, skills, and experience of employees.

Workforce Shaping Strategy Service 718 provides additional services to users such as designing work people enjoy or are well suited for; creating purpose-drive jobs, re-engineering or creating new roles within an organization based on changing skills and experience needed to meet the company's strategy and/or as a result of external macro-economic changes, etc.

Various users may communicate with Professional Digital Wallet Platform 710 including Holder 702, Issuer 704, 706, and Verifier 708. The platform may support other users and entities.

Holder 702 may represent Employees and Candidates. Through Matching Engine 714 and Community Platform 716, employees and candidates may find purpose, feel supported, seek guidance, feel engaged at work as well as plan for the future. Through Whole Resume Module 712, employees and candidates may provide profile data, experiential details as well as share details on career aspirations or goals, skills and experiences they find interesting, and further share what motivates them, and context as attestation.

Issuer 704 may generally represent employers, such as hiring managers, etc. Verifier 704 may issue moments that matter; recognizing employee accomplishments, etc. This further enables Verifier 704 to build more specialized teams. Other features include expanding the talent pool (e.g., obtain better ROI and lower churn); providing coaches/mentors, retaining future leaders, etc. Employers may better understand and reach future talent generations as well as identify and connect with under-represented talent.

Verifier 708 may also represent employers. In this example, Verifier 708 may represent an employer that has been granted access to the platform (e.g., subscription, payment, etc.). Verifier 708 may gain a comprehensive understanding of potential candidates beyond their qualifications. Verifier 708 may make informed decisions based on verified credentials and significant moments in a candidate's career.

Issuer 706 may represent an Ecosystem Partner, such as Universities; Industry Associations; Technical Certification Providers; Skill Certifiers, etc. Issuer 706 may issue credentials which may lead to more visibility and improved job placement rates.

An embodiment of the present invention is directed to aggregating/clustering skills associated with a particular job position being sought, pursued, and/or highlighted by an applicant. For example, if a managing partner position is available, the platform may query user/applicant data to identify applicants with relevant skillsets—including trusted counsel, people management, asset management, communication, etc.

For Employers, an embodiment of the present invention is directed to an Insights Dashboard that provides employers with analytics on skill trends, popular credentials as well as employee engagement, diversity metrics, and generational insights for tailored workforce shaping strategies. An embodiment of the present invention is directed to Advanced Matchmaking that applies advanced AI-driven matchmaking based on skills, credentials, employee career aspirations, and employer needs. For example, a Job Description Upload feature may support skill extraction and provide enhancement suggestions.

An embodiment of the present invention is directed to Skills Forecasting that uses artificial intelligence (AI) to analyze current job market trends, identifying in-demand skills for the near future. Skill Gap Analysis may identify organizational skill gaps compared to industry benchmarks and competitors. An embodiment of the present invention provides employers with a visual representation of skill distribution within their organization, highlighting areas of strength and gaps.

Other features may include: Team Skill Overlays that allows managers to overlay the skills of their team members to identify synergies and gaps for project planning. In addition, bi-directional integrations with human resource managers (HRMs) improves communication, efficiencies and supports consistency.

An embodiment of the present invention is directed to a Future Skills Predictions that involves an artificial intelligence (AI)-driven tool that anticipates the evolution of skills and emergence of new competencies for long-term planning. In addition, a Talent Marketplace enables employers to post job opportunities or projects where employees can respond and apply. This provides an ability for employers to search for candidates based on specific skills, experiences, and/or other relevant data points.

For Employees, an embodiment of the present invention is directed to Resume Enhancements that integrate work preferences, aspirations, and career development pathways and suggests potential career paths or roles based on an employee's credentials.

An Endorsement feature allows employees to endorse each other's skills and credentials, adding a layer of peer validation. A Credential Combinations feature provides for stacking skills and experiences to create moments that matter using generative AI to create new combinations. Credential visuals use generative AI to create a visual identity of moments that matter. Community and Networking features enable employees to connect, share experiences, and/or seek and match with mentors. A Self-Custody feature gives employees control over their credentials, ensuring data sovereignty and flexibility.

An AI-driven credential issuance feature analyzes work to identify skills and experiences to capture. A Skill Gap Analysis feature provides insights on skills a potential candidate may want to develop based on industry trends and employer needs. Learning and Development (L&D) Integration allows employees to pursue learning opportunities or courses directly linked to the skills or credentials they wish to acquire.

An embodiment of the present invention is directed to a Digital Identity that secures candidate and employee verification through Digital Identity and KYC protocols, boosting employer trust. A Job Submission features provides a simplified (e.g., one click submit) ability to view verified elements of a whole resume tailored to the position (which may be powered by generative AI).

For Ecosystem Partners, an embodiment of the present invention is directed to tools for employers and ecosystem partners to analyze data, track trends, and generate reports on skill gaps, popular credentials, etc. A Collaboration Portal provides a space for ecosystem partners to collaborate with employers on defining skill needs and creating tailored credentials.

Other features include integrations of additional types of credentials.

An embodiment of the present invention is directed to evolving skills ontology that maintains a dynamic skills database that adapts to industry trends and job market shifts.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages will be apparent to those skilled in the art from consideration of the specification and practice of the embodiments disclosed herein. The specification and examples should be considered exemplary.

What is claimed is:

1. A computer-implemented system that implements a verified digital assets platform, the platform comprising:
   a microservices interface that communicates with a distributed ledger and further interfaces with an off-chain metadata data store;
   a user interface that communicates with one or more users; and
   a computer processor that is coupled to the microservices interface and user interface and further programmed to perform the steps of:
      enabling an issuer to confer one or more achievement recognitions to a recipient, the issuer comprising one or more of: institutions, universities, employers, or professional certification providers that certify skills, demonstrated skills, degrees, or professional credentials, wherein the one or more achievement recognitions comprise verifiable professional credentials selected from the group consisting of: educational degrees, professional certifications, and demonstrated workplace skills, and wherein the one or more achievement recognitions are verified;
      generating a digital token that uniquely identifies each achievement recognition based on verification of the achievement recognition by the issuer through a verification process that confirms completion of one or more educational requirements;
      storing the digital token on the distributed ledger; and
      providing access to the digital token via a digital wallet that is associated with the recipient wherein the digital wallet manages at least one private key to an account of the distributed ledger wherein the digital token represents at least one recognition conferred to the recipient.

2. The system of claim 1, wherein the microservices interface communicates with the distributed ledger via a smart contract.

3. The system of claim 2, wherein the digital token is stored on the distributed ledger via the smart contract.

4. The system of claim 1, wherein the distributed ledger comprises a public blockchain.

5. The system of claim 1, wherein the distributed ledger comprises a permissioned blockchain managed by a consortium.

6. The system of claim 1, wherein the one or more users comprise employees, candidates, employers or issuers.

7. The system of claim 1, wherein the digital wallet enables the recipient to connect to the account, retrieve a desired credential from the distributed ledger and allow the recipient to perform one or more actions.

8. The system of claim 1, wherein the one or more recognitions comprises one or more of: credentials, certificates, degrees, experiences, skills, or achievements.

9. The system of claim 1, wherein the one or more recognitions are verified through issuers, peer validation or peer endorsement.

10. The system of claim 1, wherein the one or more recognitions are further enriched with additional data from one or more sources.

11. A computer-implemented method that implements a verified digital assets platform, the method comprising the steps of:
   enabling, via a user interface, an issuer to confer one or more achievement recognitions to a recipient, the issuer comprising one or more of: institutions, universities, employers, or professional certification providers that certify skills, demonstrated skills, degrees, or professional credentials, wherein the one or more achievement recognitions comprise verifiable professional credentials selected from the group consisting of: educational degrees, professional certifications, and demonstrated workplace skills, and wherein the one or more achievement recognitions are verified, wherein the user interface communicates with one or more users via a communication network;
   generating, via a computer processor, a digital token that uniquely identifies each achievement recognition based on verification of the achievement recognition by the issuer through a verification process that confirms completion of one or more educational requirements;
   storing the digital token on a distributed ledger that communicates with a microservices interface and an off-chain metadata data store; and
   providing access to the digital token via a digital wallet that is associated with the recipient wherein the digital wallet manages at least one private key to an account of the distributed ledger wherein the digital token represents at least one recognition conferred to the recipient.

12. The method of claim 11, wherein the microservices interface communicates with the distributed ledger via a smart contract.

13. The method of claim 12, wherein the digital token is stored on the distributed ledger via the smart contract.

14. The method of claim 11, wherein the distributed ledger comprises a public blockchain.

15. The method of claim 11, wherein the distributed ledger comprises a permissioned blockchain managed by a consortium.

16. The method of claim 11, wherein the one or more users comprise employees, candidates, employers or issuers.

17. The method of claim 11, wherein the digital wallet enables the recipient to connect to the account, retrieve a desired credential from the distributed ledger and allow the recipient to perform one or more actions.

18. The method of claim 11, wherein the one or more recognitions comprises one or more of: credentials, certificates, degrees, experiences, skills, or achievements.

19. The method of claim 11, wherein the one or more recognitions are verified through issuers, peer validation or peer endorsement.

20. The method of claim 11, wherein the one or more recognitions are further enriched with additional data from one or more sources.

\* \* \* \* \*